United States Patent
Konstantin

(10) Patent No.: US 8,534,008 B1
(45) Date of Patent: *Sep. 17, 2013

(54) DUAL PANEL SYSTEM FOR CONTROLLING THE PASSAGE OF LIGHT THROUGH ARCHITECTURAL STRUCTURES

(75) Inventor: Moshe Konstantin, Highland Park, IL (US)

(73) Assignee: Konvin Associates Ltd., Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,406

(22) Filed: Jun. 25, 2012

Related U.S. Application Data

(60) Division of application No. 11/872,523, filed on Oct. 15, 2007, now Pat. No. 8,205,386, which is a continuation of application No. 10/600,261, filed on Jun. 20, 2003, now Pat. No. 7,281,353.

(51) Int. Cl.
*E04D 13/035* (2006.01)
*E04D 13/03* (2006.01)

(52) U.S. Cl.
CPC .................................. *E04D 13/033* (2013.01)
USPC .............. 52/173.3; 52/1; 52/786.11; 49/82.1; 49/92.1; 49/74.1

(58) Field of Classification Search
USPC ..................... 52/1, 173.3, 200, 786.1–786.13; 49/82.1, 74.1, 92.1; 362/325; 160/5, 107, 160/236; 126/702
See application file for complete search history.

(56) References Cited

U.S. PATENT DOCUMENTS

| | | | | |
|---|---|---|---|---|
| 5,221,363 | A * | 6/1993 | Gillard | 52/173.3 |
| 5,437,129 | A * | 8/1995 | Konstantin | 52/200 |
| 6,499,255 | B1 * | 12/2002 | Givoni | 49/82.1 |
| 6,978,578 | B2 * | 12/2005 | Givoni | 49/82.1 |
| 7,281,353 | B2 * | 10/2007 | Konstantin | 49/82.1 |
| 8,205,386 | B2 * | 6/2012 | Konstantin | 49/92.1 |

\* cited by examiner

*Primary Examiner* — Mark Wendell
*Assistant Examiner* — Matthew J Smith
(74) *Attorney, Agent, or Firm* — Drinker Biddle & Reath LLP

(57) ABSTRACT

The invention comprises a transparent/translucent panel system including two spaced flat panels and a series of elongated, abutting, rotatably mounted transparent/translucent light-controlling members disposed between the panels in which the light-controlling members are at least partially tubular or have annular members along their length to facilitate rotation of the light-controlling members and include a light-blocking surface whereby differently sized light-controlling members may be used and the light-controlling members, when rotated by a simple drive mechanism, can vary the light passing through the panel system from clear to opaque and can effectively block light between adjacent light-controlling members.

14 Claims, 14 Drawing Sheets

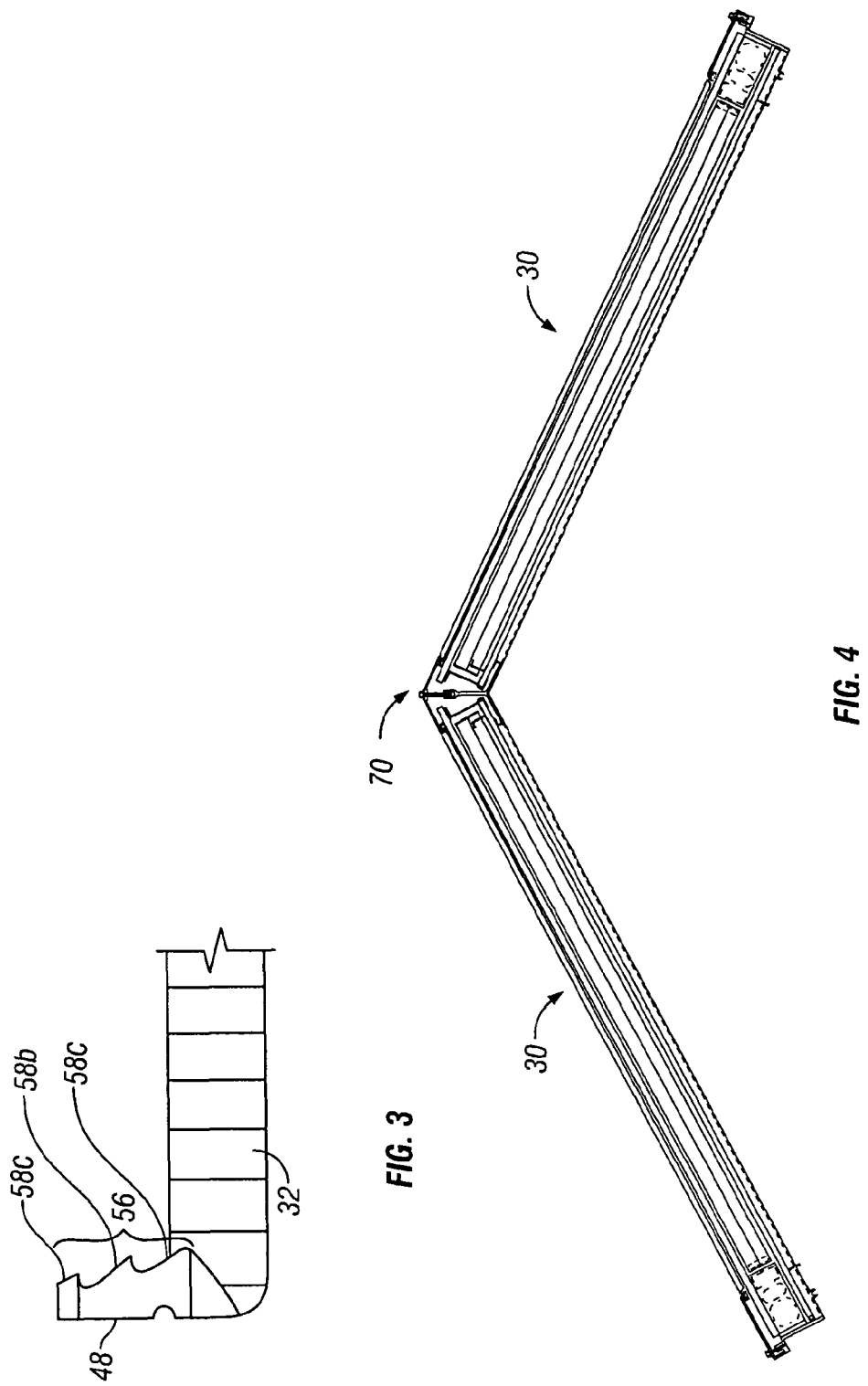

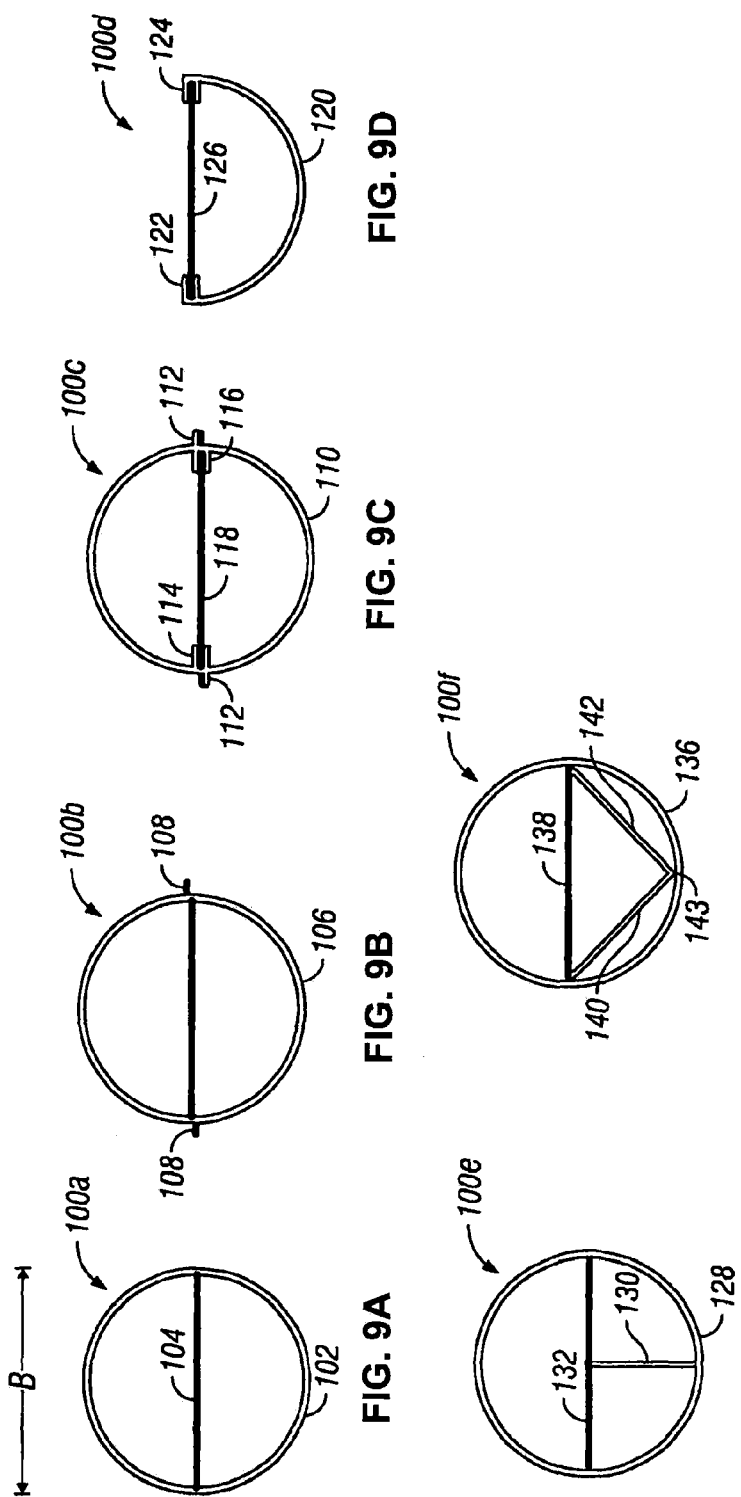

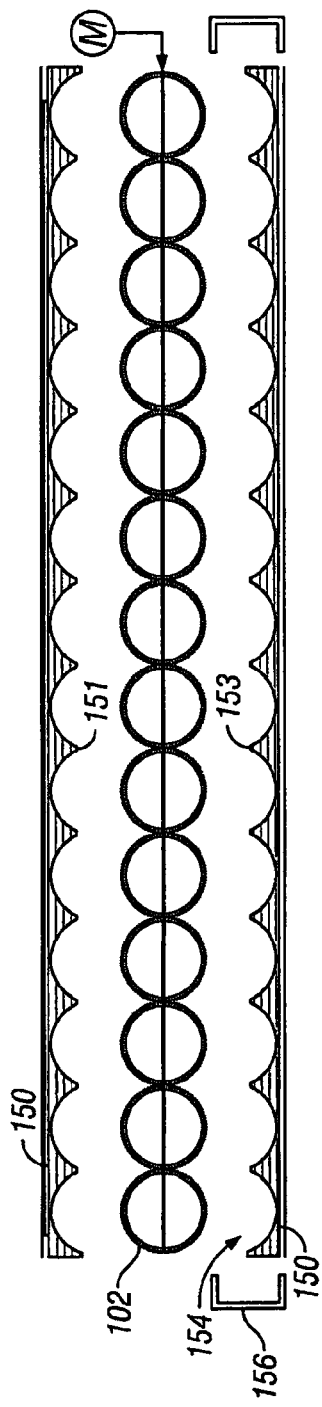
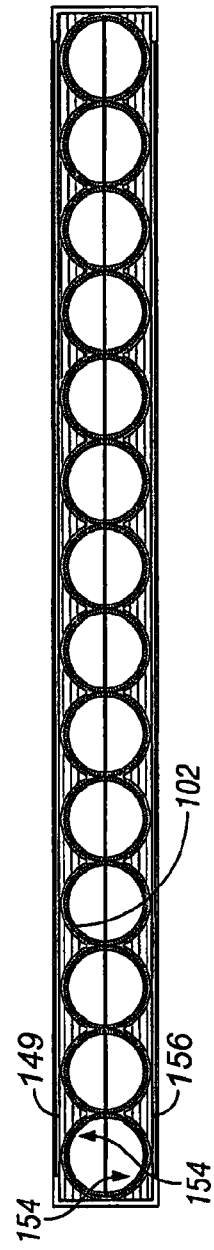
FIG. 12A
FIG. 12B

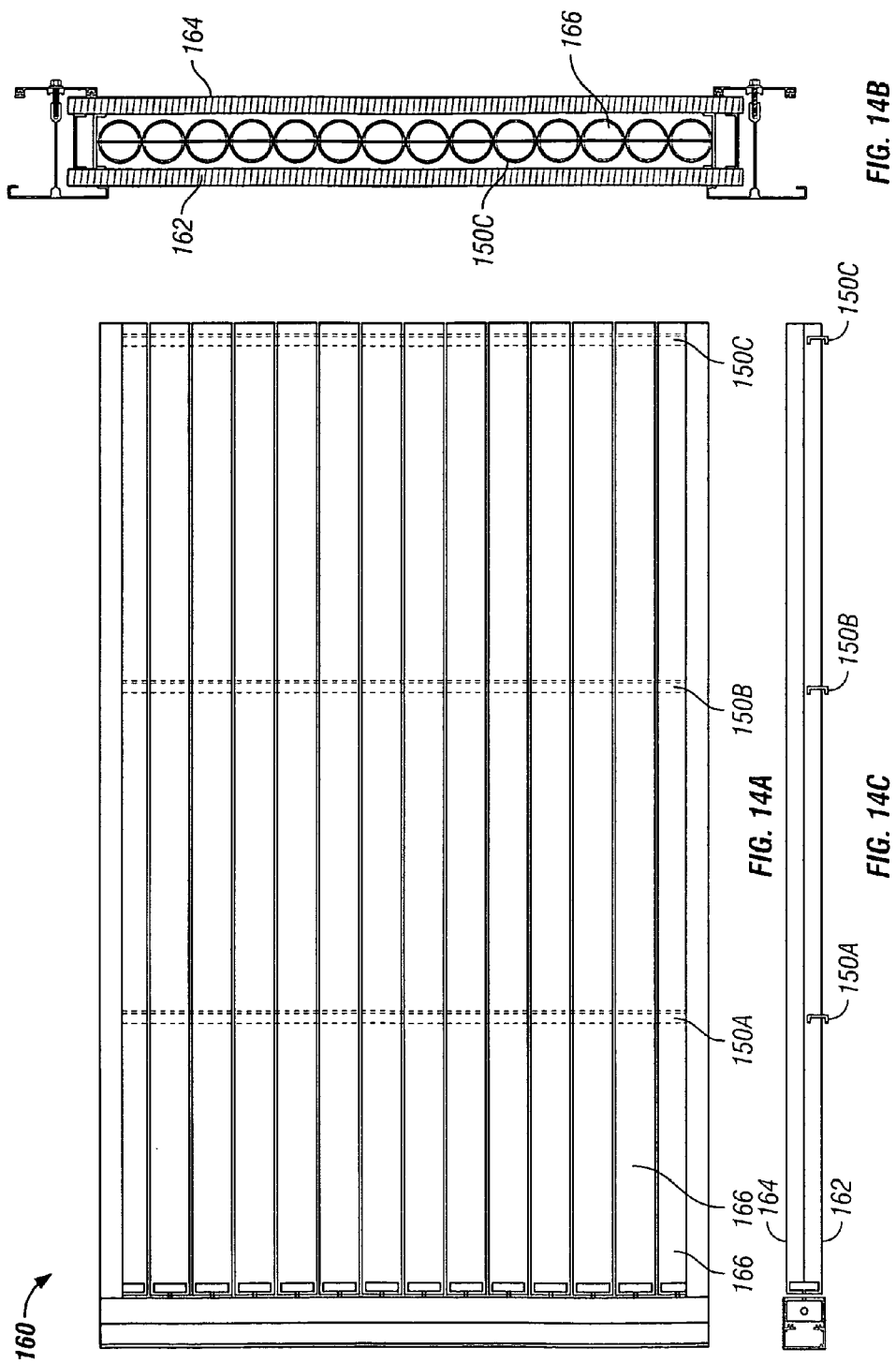

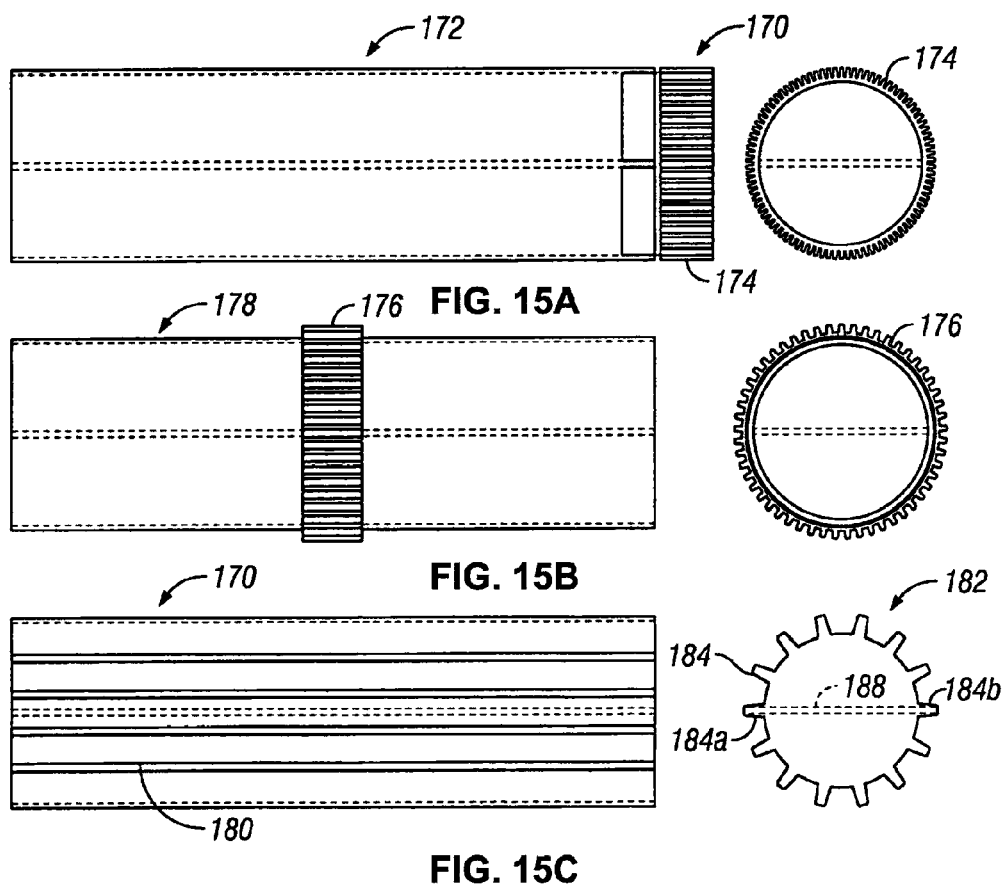

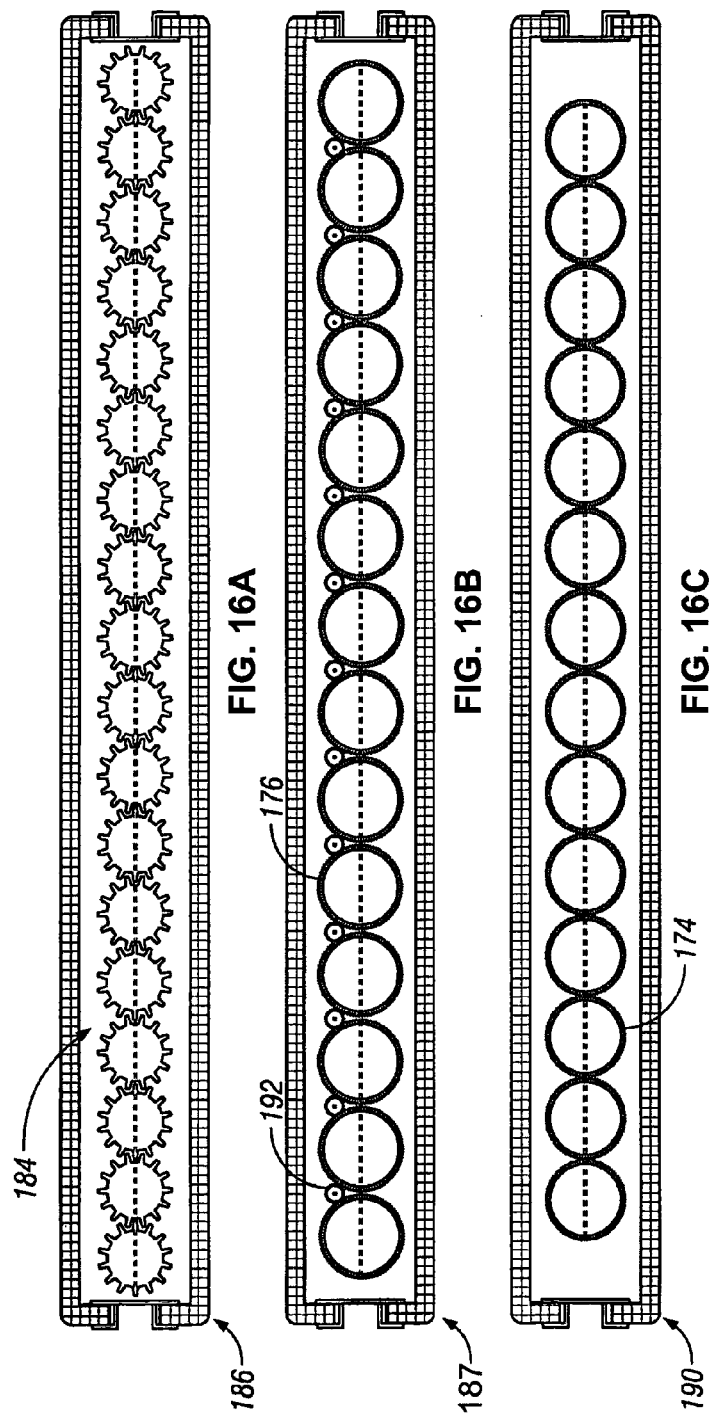

DUAL PANEL SYSTEM FOR CONTROLLING THE PASSAGE OF LIGHT THROUGH ARCHITECTURAL STRUCTURES

This application is a divisional of U.S. patent application Ser. No. 11/872,523, filed Oct. 15, 2007 now U.S. Pat. No. 8,205,386, issued Jun. 26, 2012, which is a continuation of U.S. patent application Ser. No. 10/600,261, filed Jun. 20, 2003 now U.S. Pat. No. 7,281,353, issued Oct. 16, 2007. The entire disclosures of the foregoing patent applications are hereby incorporated by reference.

FIELD OF THE INVENTION

This invention relates to architectural structures designed to pass light and, more particularly, to transparent/translucent panel systems for controlling the level of light admitted through sloped glazing, skylights, roofs, walls, and other architectural structures designed to pass light.

BACKGROUND OF THE INVENTION

Various types of transparent and translucent glazing systems are available for the construction of sloped glazing, skylights, roofs, walls, and other architectural structures designed to pass light for daylighting interiors and other purposes. When using such glazing systems, it is often desirable to optimize the system's shading coefficient by reducing solar heat gain on hot summer days and during peak sunlight hours year round, while providing maximum light on cold winter days and when it is most needed. It is often necessary to minimize glare and direct sunlight at peak sunlight periods, to ensure comfort of those who occupy the space exposed to the glazing system. If architects and space planners can be liberated from the constraints of fixed light transmission, they can maximize interior daylight without the burden of unmanaged heat gain or discomforting glare.

Indeed, if the level of light passing through sloped glazing, skylights, roofs, walls, and other architectural structures designed to pass light can be simply and efficiently controlled, it will enable architects and space planners to design more efficient HVAC systems, by reducing or maximizing heat gain during those limited periods that require peak HVAC system performance and consequently reducing air conditioning and heating capacity requirements. Instead of investing in expensive over-capacity equipment to handle the limited excessive sunlight and cold days in any given year, the architects and space planners can rely on the glazed panel to reduce the peak demand times and therefore the maximum HVAC load capacity.

The known approaches to controlling the amount of light admitted through glazing systems, however, are limited and are generally difficult or expensive to construct and service. There is therefore a substantial need for a flexible, inexpensive, reliable and readily serviceable system for achieving this purpose.

Prior approaches to controlling the level of light passing through architectural structures have been of only limited usefulness. For example, louver blind assemblies using pivoting flexible members operable inside a chamber formed by a double-glazed window unit have been suggested for this purpose. Such louver blinds require substantial support of the flexible members which, additionally, must be controlled from both their distal and their proximal ends. Furthermore, louver blinds are difficult and expensive to assemble, apply, operate, maintain and replace, and cannot be readily adapted for use in non-vertical applications or in applications in which it is either desirable or necessary to control the flexible members from only one end.

U.S. Pat. No. 6,499,255 provides another, more recent approach to addressing this challenge. The '255 patent describes a unitary transparent or translucent panel of controllable radiation transmissivity comprising a plurality of rotatably-mounted radiation-blocking tubular members having at least one portion which is substantially opaque and means for rotating the radiation-blocking members to block out varying amounts of the radiation striking the panel by varying the area of the opaque portions presented to the incoming light. It is key to this structure that the radiation-blocking members be mounted in a series of adjacent segregated tubular cells which make up the unitary panel.

While the unitary panel described in the '255 patent represents an important advance in the art, it has some shortcomings. For example, adjacent tubular members cannot abut each other due to the intervening clear or transparent walls of the tubular cells. Thus, when the tubular members are in the fully closed position, light still passes through the clear or translucent material of the unblocked cell walls between the adjacent radiation-blocking members. Also, if a tubular member fails, the entire panel must be removed and replaced. This may be prohibitively complex and expensive in certain applications. Where the panels are part of a protected enclosure, removal of an entire panel will expose the interior of the enclosure to the exterior environment which can be problematic.

Additionally, in the design of the '255 patent the diameter of the radiation blocking members is constrained by the size of the cells—where circumstances make larger or smaller radiation-blocking members desirable or necessary due to economic or other reasons, the system of the '255 patent cannot accommodate them. For example, the maximum cell size available following the teaching of the '255 patent is 30 mm×30 mm due to manufacturing constraints in extruding the panels. Thus, a panel width of 1 meter by 30 mm in thickness or depth will require 33 tubular members as well as 33 related driven mechanisms which extend beyond the end of the panel. This is a very complex and expensive design which could be made substantially simpler and less expensive if the same result could be achieved with fewer larger diameter radiation-blocking members or with simpler drive mechanisms that preferably could be substantially contained within the area defined by the panel. Furthermore, the unitary cellular panel structure of the '255 patent resists bending, making it difficult to use the system in architectural applications where tight radius bends are required. Additionally, the cellular-panel structure has insulation, soundproofing and structural limitations arising from its maximum 30 mm thickness or depth that make its use less than ideal in applications calling for high insulation values, substantial soundproofing and long span construction. Finally, the unitary cellular panel structure of the '255 patent does not permit the use of different combinations of interior and exterior panel colors and finishes as required or desirable in many architectural applications.

BRIEF SUMMARY OF THE INVENTION

It is one objective of this invention to provide a transparent/translucent panel unit in which the transmission of light across the system can be adjusted from almost full transparency or translucency to near total opacity. This is accomplished with two generally parallel spaced flat panels or sheets and a series of elongated, transparent/translucent light-controlling members disposed between the panels and mounted for rotation about their longitudinal axes. The spacing between the flat panels can be adjusted to accommodate different sizes of light-controlling members, from as little as 1 inch to 6 inches or more. Also, panel units of a highly desirable thickness or depth of about 2.75 to 4 inches or more can be produced to achieve outstanding insulation, soundproofing and structural characteristics. This makes the panels ideal for use in applications calling for high insulation values, substantial soundproofing and long span construction.

Once installed, the light-controlling members as well as other components housed between the panels can be readily accessed by removing one of the two parallel panels, leaving the second panel in place to protect areas enclosed by the panel system from exposure to the outside environment. Additionally, in one preferred embodiment of the invention, the light-controlling members may be positioned in abutting relationship to maximize the effectiveness of the system in blocking incoming light when the panel system is in the fully closed position.

Rotation of the light-controlling members may be by the application of rotary motion at one end (or less preferably at both ends) of each light-controlling member. The rotary motion may be applied to a plurality of the light-controlling members directly, as described, for example, in the '255 patent, or it may be applied indirectly. Thus, in one particularly important aspect of the invention, circular engagement surfaces are provided on adjacent light-controlling members. This enables the plurality of light-controlling members within a panel unit to be rotated by imparting rotary motion either manually or with a motorized drive to at least one of the light-controlling members which transmits the rotary motion indirectly across the contacting engagement surfaces of adjacent light-controlling members to rotate the light-blocking surfaces and vary the level of light passing through the panel unit. Also, the use of two spaced-apart panels (rather than a unitary panel as in the '255 patent) makes it possible to house some or substantially all of the drive mechanism between the panels and thus within the panel unit, out of the way of other structural components.

This system can maintain a perfect balance between light transmission and thermal performance, fostering a daylighted, comforting, livable and productive environment all year long. It also conserves energy on peak demand. The system may be fully automatic, with built-in intelligent light controllers and an embedded program that senses the daylight outside and manages the level of light and solar heat gain inside based on the level of sunlight outside. This will enable users to control natural daylight and comfort levels in any space all day long, and all year long, simply by setting desired light levels.

BRIEF DESCRIPTION OF THE DRAWINGS

The features of this invention which are believed to be novel are set forth with particularity in the appended claims. The invention, together with its objects and advantages, may be best understood by reference to the following description, taken in conjunction with the following drawings, in which like reference numerals identify like elements in the several figures, and in which:

FIG. 3 is an enlarged partial front elevation view of one panel joining flange which may be used with the present invention;

FIG. 4 is a front elevation view of adjacent panel units angled with respect to each other to form a roof ridge;

FIGS. 9A-9F illustrate a series of alternative designs of light-controlling members which may be used in the present invention;

FIGS. 12A and 12B are front elevation views of, respectively, a series of adjacent light-controlling members of a single panel unit with top and bottom scalloped carrier members spaced therefrom and with the top and bottom scalloped members affixed together and holding the light-controlling members in place;

FIGS. 14A-14C are, respectively, a top plan view of a single panel unit, an end view thereof, and a cross-section thereof;

FIGS. 15A-15C illustrate three alternative means for transmitting motion across adjacent light-controlling members;

FIGS. 16A-16C illustrate end views of means for transmitting motion across adjacent light-controlling members.

DETAILED DESCRIPTION OF THE INVENTION

Figure 1:
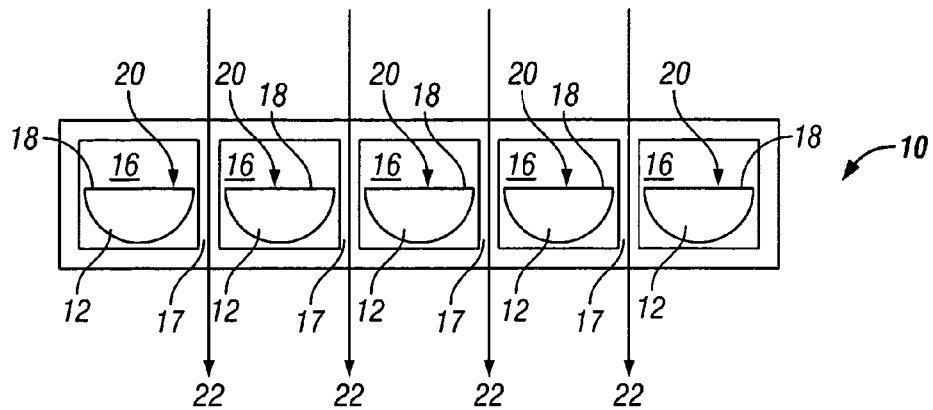
FIG. 1 is an elevational view of a portion of a prior art panel in accordance with the teaching of U.S. Pat. No. 6,499,255.

Turning first to FIG. 1, an elevational view of a transparent or translucent panel 10 in accordance with the teaching of prior U.S. Pat. No. 6,499,255 is shown. Panel 10 includes a series of half-cylinder louvers 12 rotatably mounted in a series of adjacent, segregated cells 16 separated by walls 17. Louvers 12 each have an opaque top surface 18. Thus, in the illustrated embodiment where the louvers are in the fully closed position, light rays 20 strike opaque surfaces 18, which block light transmission through the louvers. Unfortunately, the transparent or translucent material in the walls 17 between adjacent cells remains unblocked, which means that light rays 22 will penetrate the panel through these walls. Thus, even with all of the louvers in the fully closed position, the panels of the '255 patent admit light: in one commercial embodiment of this invention, the panels have been found to admit a minimum of about 6% light transmission. Also, the panel of the '255 consists of one integral, hollow core, multi-cell panel with inserted radiation-blocking members in the cells, which means that serviceability and maintenance options are limited.

The panel systems of the present invention are referred to as being transparent/translucent. It is intended to mean by this that the panel systems range from transparent (transmitting light rays so that objects on one side may be distinctly seen from the other side) through translucent (letting light pass but diffusing it so that objects on one side cannot be clearly distinguished from the other side). Also, the panel systems may be tinted. Typical tinting colors include white, bronze, green, blue, and gray, although other colors may be used. Further, the panels may have a matte finish. Finally, combinations of different top and bottom panels may be used, such as clear/clear, white/clear, clear/white, bronze/clear, green/clear, green/white, bronze/white, white/white, etc.

Also, when reference to "light" is made in the description of the present invention, it should be construed to include the spectral range of visible light as well as electromagnetic radiation below and/or above that spectral range.

Figure 2A:
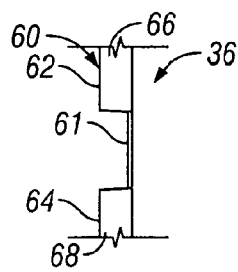
FIG. 2A is a partial enlarged view of the spacer rails of FIG. 2.
Figure 2B:
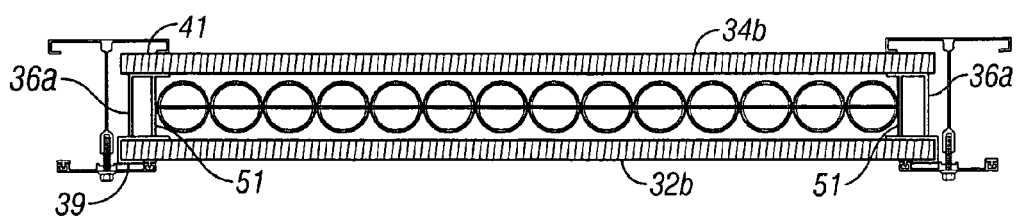
FIG. 2B is an elevational view of an alternate panel joining arrangement in accordance with the invention.
Figure 2:
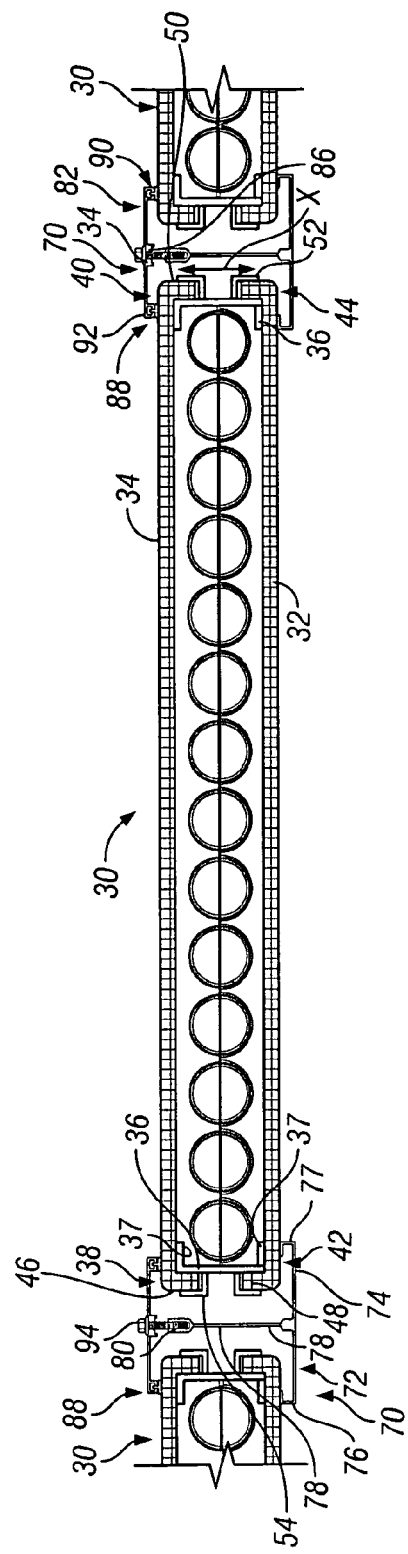
FIG. 2 is a front elevation view of a panel unit in accordance with the present invention, attached to adjacent panel units which are shown in part.

Turning now to FIG. 2, a panel system unit 30 in accordance with the invention is shown consisting of two generally flat transparent/translucent panels, including an interior panel 32 and an exterior panel 34. Panels 32 and 34 are generally parallel and are separated a distance "x" by elongated spacer rails 36 with top and bottom ledges 37 which extend along the lateral edges 38, 40, 42 and 44 of the interior and exterior panels. This spacing may be of any desired size, since the spacing of the panels can be adjusted to accommodate whatever diameter is chosen. While panels 32 and 34 may be of any desired width, currently preferred widths are 24, 48 and 60 inches. Also, while the panels may also be any desired length, it is currently intended that panels about 2 feet to 60 feet in length will be used.

The lateral edges of the panels may be provided with respective panel joining flanges 46, 48, 50 and 52 for conveniently assembling the panels together. In one such panel-joining arrangement, the flanges each have a smooth outer face 54 and an inner face 56 with tooth-like detents 58a-58c (FIG. 3), whose function will be explained below. A similar joining flange structure is described, for example, in U.S. Pat. Re. 36,976, the contents of which are incorporated herein by reference. Also, panels with different panel joining flange designs and other panel-joining arrangements may be used.

As seen best in FIG. 2A, spacer rails 36, in turn, each have an outer bracket 60 shaped as shown, to provide a middle attachment section 61 and offset ends 62 and 64. The brackets are attached to the outer surface of each of the spacer rails by conventional means, with attachment section 61 centered along the rails, thereby defining top and bottom channels 66 and 68 between the outer surface of the spacer rails and the inner surface of the bracket. The channels are dimensioned to accept flanges 48-52 in a tightly fitting manner to firmly and sealingly join the panels under an elastic deformation of the detents. Thus, when the panels are pressed home to assemble the panel system unit with the inner surfaces of panels 32 and 34 abutting ledges 37, there is resistance to removal of either of the panels from these channels. If and when a repair is needed, it is necessary only to release one corner of the panel flange with an appropriate tool, and then continue to zip it along the length of the panel to release the entire panel. The panel can be reinstalled after the repair is completed by again pressing the panels home to seat the panel flanges in the channels.

An alternate panel-joining arrangement is depicted in FIG. 2B. In this embodiment, internal and external panels 32a and 34b may be any appropriate sheet material. The sheets are held together in this embodiment by retainers 36a which extend along the opposite lateral edges of the sheets. Retainers 36a include two channels 39 and 41 in which the lateral edges of the sheets snugly rest and a spacer 51 carrying the flanges at the desired sheet spacing of the panel system. The retainers preferably are made of aluminum or of another metal which either inherently resists corrosion or is treated to resist corrosion.

Any number of fully assembled panel units 30 can be joined to adjacent panel units to achieve the panel system width called for in a particular application. Adjoining panel units may be fixed to each other using a clamping system 70. This clamping system includes a bottom member 72 with a base 74 and elongated bottom pedestals 76 and 77 along each lateral edge of the base. An upstanding bracket 78 along the center of the base with a series of screw thread-receiving apertures 80 along its length. Clamping system 70 also includes a top member 82 with an upstanding reinforcing strip 84 along its center and a series of screw-receiving apertures 86 running along the strip. Along each lateral edge of the top portion, a pair of elongated top pedestals 88 and 90 are provided with apertures for receiving resilient sealing gaskets 92.

In order to join the adjacent lateral edges of the panel units, the clamping members are positioned as illustrated, with elongated bottom pedestals 76 and 77 abutting the exposed surface of the interior panels and sealing gaskets 92 of top pedestals 88 and 90 abutting the top surface of the exterior panels. A series of screws 94 spaced, for example, at intervals of about 8-16 inches, are passed through the apertures 86 and into the thread-receiving apertures 80, and screwed home to lock the clamping member together and seal the connection from outside elements.

Figure 5:
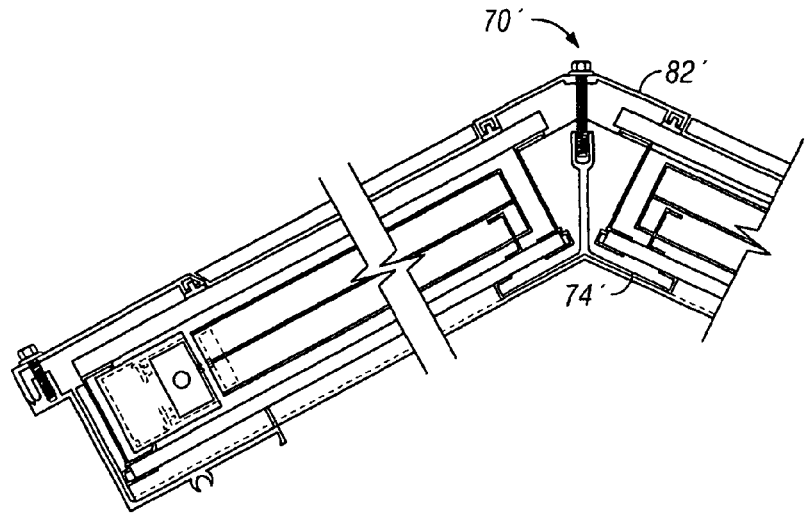
FIG. 5 is a partial enlarged view of a portion of the structure illustrated in FIG. 4.

FIGS. 4 and 5 illustrate an alternate application of the invention where adjacent panel units are angled with respect to each other to form a roof ridge. In this embodiment, a modified clamping system design 70' is used. This modified clamping system generally corresponds to clamping system 70 except that base 74' and top member 82' are angled to produce the desired ridge slope.

Figure 6:
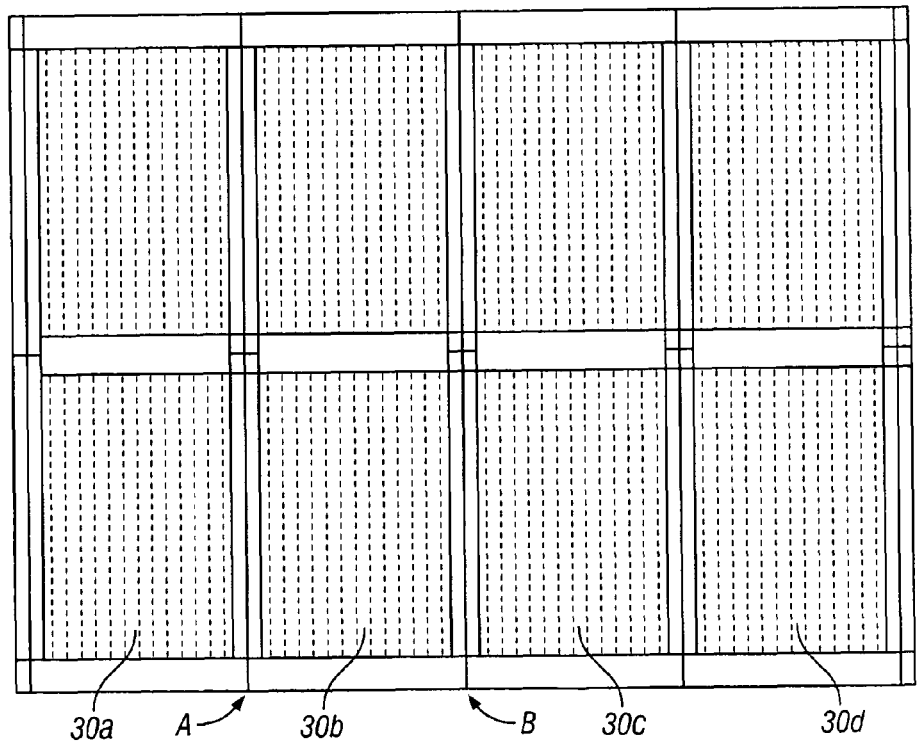
FIG. 6 is a plan view, of a portion of the structure illustrated in FIG. 4.
Figure 7:
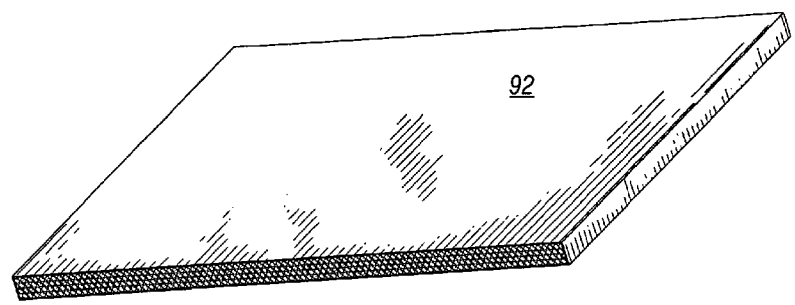
FIG. 7 is a perspective view of a honeycomb polycarbonate translucent panel which may be used in constructing a panel unit in accordance with the present invention.

A series of four panel units assembled to produce a panel system for use in a skylight is illustrated in FIG. 6. In this fully assembled system, the four panel units 30a, 30b, 30c, and 30d are each individually assembled and joined to adjacent panel units as illustrated in FIG. 2 and described above.

The use of removably mounted interior and exterior panels facilitates easy replacement of damaged panels without exposing the interior of the enclosed structure. Adding or replacing a double-layer on other glazing system, in contrast, would be significantly more difficult and expensive, and could produce damage requiring repairs that interrupt the function of the architectural structure in which the panel system is mounted.

Thus, assuming for purposes of illustration that exterior panel of panel unit 30b has to be removed to remedy a problem within the panel unit. This can be accomplished by inserting an appropriate tool at point A to remove the leading corner of the panel flange from its corresponding channel and then continue to zip it along the length of the panel to release the entire panel. This is repeated at point B whereupon the entire panel is removed, the problem is remedied and the exterior panel re-installed by positioning the flanges adjacent the channels and pressing the exterior panel home as describe earlier. It should be noted that this entire repair operation can be accomplished without disturbing the interior panel of the panel unit. Also, either of the sheets of the alternative panel-joining arrangement of FIG. 2B may be removed in a similar fashion by slipping the appropriate channel from the edge of the sheet which is to be removed and reattaching the channel when the repair is completed.

A wide variety of different types of panels made of various transparent and translucent materials may be used, including, but not limited to, plastics (including, but not limited to, polycarbonates and acrylics), fiberglass, perforated metal fabric, or glass. It is preferred, however, that the panels have at least the appropriate light transmitting properties and a minimum resistance to impact of about 10 ft/lb. Also, a UV-resistant architectural face can be co-extruded with the panel to minimize the need for periodic resurfacing.

In one preferred embodiment, a Pentaglas® honeycomb polycarbonate translucent panel available from CPI International Inc. (Lake Forest, Ill.) will be used. These polycarbonate panels are described in U.S. Pat. No. 5,895,701, which is incorporated herein by reference, have an integral extruded honeycomb structural core consisting of small honeycomb cells approximately 0.16 inch by 0.16 inch which provides internal flexibility to absorb expansion and minimize stress and resists impact buckling. The resulting design offers smaller spans between rib supports, resulting in stronger durability, as well as superior light quality, visual appeal, higher insulation and excellent UV resistance. The internal flexibility of the panels absorbs thermal expansion through the panel in all directions (on the x, y, and z axes). This minimizes stress in all directions and preserves dimensional stability. The panels also have a high impact absorbing and load bearing property, a good ratio of weight to strength, and UV protection on both sides of the panel. The superior light diffusion capabilities ensure excellent quality of natural light. The panels are environmentally friendly, non-toxic, and made of 100% recyclable material.

Figure 8:
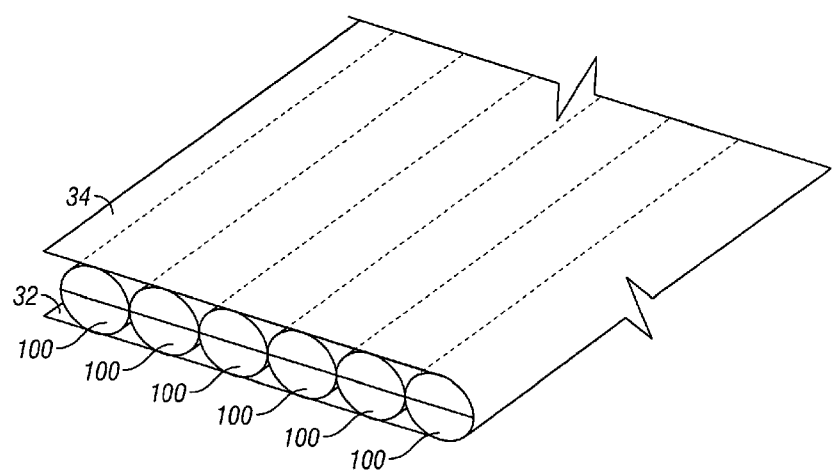
FIG. 8 is a diagrammatic perspective view of a series of abutting light-controlling members.

A series of elongated rotatably mounted light-controlling members 100 corresponding in length to the length of the panel units are disposed between panels 32 and 34, as represented in a diagrammatic perspective fashion in FIG. 8. As described below, the light-controlling members may be of a variety of different structures. In a preferred embodiment, the light-controlling members will have a circular outer rotation surface (e.g., an elongated tube or a series of outer annular members disposed along the light-controlling members generally perpendicularly to the longitudinal axes of the light-controlling members) extending at least about 180° around their circumference. In the illustrated embodiment, the light-controlling members abut each other (tolerance about 1-3 mm) to maximize the light blocking capability of the system. This is a preferred embodiment of the invention. However, in alternative embodiments, the light-controlling members may be spaced from each other permitting some light to pass between adjacent light-controlling members, so long as the circular engagement surfaces of adjacent light-controlling members remain in contact.

Figure 9G:
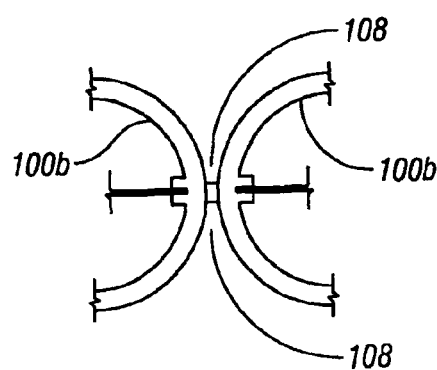
FIG. 9G is an enlarged partial view of a pair of particular light controlling members in abutting position.

A series of alternative designs of the light-controlling members 100 are illustrated in cross-section in FIGS. 9A-9F. For example, a light-controlling member 100a may be used, comprising a generally elongated transparent or translucent tube 102 having a diameter "B" (FIG. 9A). A generally planar light-blocking or opaque member 104 is positioned in the tube across its diameter by co-extruding the outside tubular wall and the light-blocking or opaque member or by inserting the light-blocking or opaque member in a preformed tube.

Figure 9H:
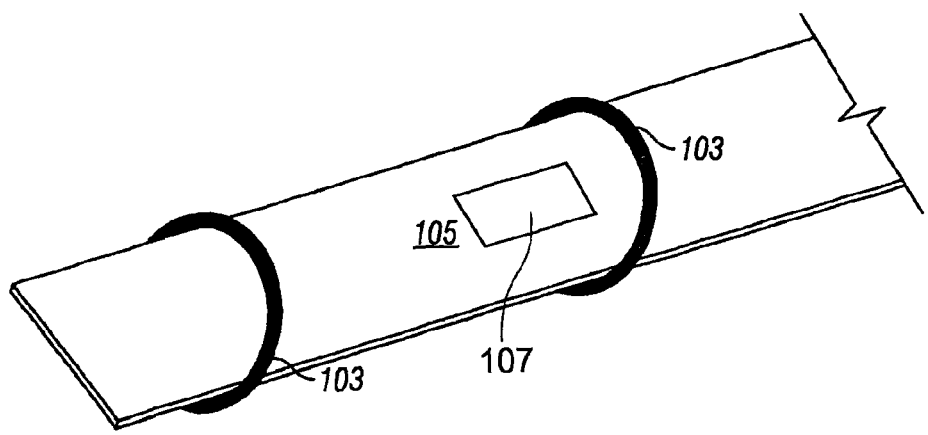
FIG. 9H is a partial view of a light-controlling member comprising a flat opaque member with a series of rings spaced along its length.

The light-blocking or opaque member need not be flat but may, for example, be wider than the allowed space and inserted in a "bowed" or other configuration. In the illustrated embodiment, tube 102 may be replaced by a series of annular members or rings 103 spaced along an opaque member 105 (FIG. 9H). In this embodiment, the opaque member should be sufficiently rigid so that applying rotary movement to the opaque member at any point along its length will cause the entire light-blocking or opaque member to rotate about its longitudinal axis without causing the opaque member to twist substantially out of its initial configuration.

The light-blocking members may be opaque or they may be translucent or tinted to a level which produces the desired degree of light-blocking. Also, the light-blocking members may be segmented into light-blocking or opaque portions and transparent/translucent portions. For example, in a 40-foot panel unit with corresponding 40-foot light-controlling members, the first 10 feet of one or more of each of the light-blocking members may be opaque, the next 5 feet transparent/translucent, and the last 25 feet opaque. Such a segmented arrangement might be used where it is desired to maintain a lighted area at all times.

Light-controlling member 100b (FIG. 9B) is generally of the same design as light-controlling member 100a including a tube 106, except that longitudinal sills 108 project radially from the outer surface of the tube. When the tubes are positioned so that the sills abut at least partially as the tubes rotate (FIG. 9G), the range of motion of the tubes is limited by the abutting sills to 180°. Also, the sills may be either opaque themselves (as shown) or coated with a light-blocking or opaque material. This provides enhanced light blocking when the sills approach and reach an abutting position since light between the tubes is blocked by the sills. Furthermore, the use of light-blocking or opaque sills in this fashion makes it possible to increase the spacing between the adjacent tubes without sacrificing light blocking between the tubes, so long as the sills are also widened to insure that they extend into the space between the adjacent tubes. Of course, tubes with light-blocking or opaque sills as described above may also be arranged so that the sills do not actually touch as the tubes rotate, which will permit some light to pass between the sills when the light-controlling members are in the closed position. Lastly, the tubes may be provided with only one light-blocking or opaque sill each or with more than two sills at varying locations about the circumference of the tubes.

Light-controlling member 100c (FIG. 9C) comprises a tube 110 with opaque-coated outer sills 112 and a pair of opposing slots 114 and 116 formed at the inside diameter of the tube to receive an opaque member 118 which is assembled into the tube after it is formed. In all cases, the opaque member is rendered opaque by known techniques, such as painting, by coating with an opaque film, by applying an opaque plastic layer by co-extrusion, etc. Also, fire resistant materials such as metal slots may be used as the opaque member to improve the fire resistance of the panel system. Additionally, different colors and designs may be applied to the opaque members to increase the visual interest of the panel system as the opaque members move into the closed position. Indeed, the opposite sides of individual opaque members may be differently colored or bear different designs to produce different visual effects by rotating the light-controlling members 180° from one fully closed position to the other.

Figure 9I:
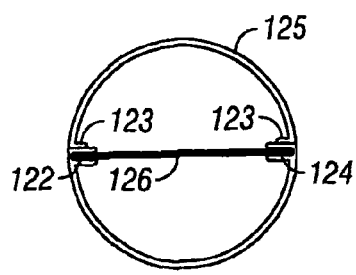
FIG. 9I is an alternate embodiment of a light-controlling member structure of FIG. 9D in which an opaque member is assembled into opposing slots of a hemispherical tube light-controlling member and then a second hemispherical tube is assembled to the first tube to form a complete tubular configuration.

Another light-controlling member design is designated 100d (FIG. 9D). This tube has a generally hemispherical cross-section and preferably its circumference extends to 180°. Although an opaque surface may be coextruded across the diameter of the tube (not shown), in the illustrated embodiment the tube 120 includes a pair of opposing slots 122 and 124 at the inside diameter of the tube to receive an opaque member 126 which is assembled into the tube after it is formed. When this structure is used, a series of annular members or rings may be disposed along the length of the light-controlling member to permit complete rotation of the light-controlling member. In another alternative embodiment, once the opaque member is assembled into opposing slots 122 and 124, another tube 125 with a generally hemispherical cross-section and lands 128 may be assembled to tube 120 (e.g., by creating an adhesive bond or a clip-on type connection at the lands) to produce a complete 360° tubular configuration as seen in FIG. 9I.

Light-controlling member 100e (FIG. 9E) comprises an opaque member 132 with a supporting wall 130, together forming an elongated light-controlling member with a "T" shaped cross-section, as shown. The supporting wall acts as a reinforcing rib to add rigidity to the opaque member and also helps position the opaque member within a series of rings 128 which are spaced along the light-controlling member. In a less preferred embodiment of the invention, the reinforcing rib may be eliminated. Light-controlling member 100f (FIG. 9F), in turn, includes a series of annular members of rings 136 and an opaque member 138 with generally perpendicular supporting walls 140 and 142 which extend along the length of the tube and abut the rings at their apex 143. Other tube configurations are illustrated in U.S. Pat. No. 6,499,255, and are incorporated herein by reference.

Figure 10A:
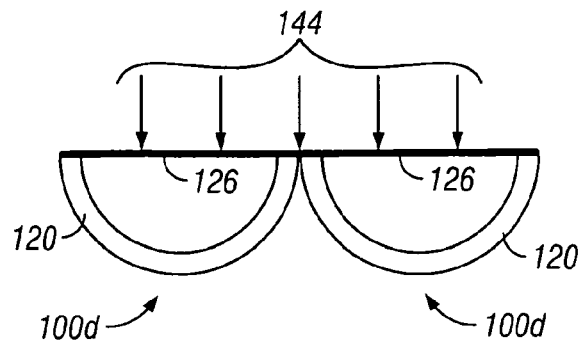
FIGS. 10A-10C are diagrammatic representations of two light-controlling members in three difference relative positions, showing the passage of varying amounts of light.
Figure 10B:
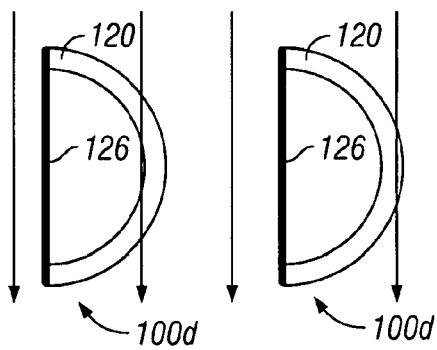
Figure 10C:
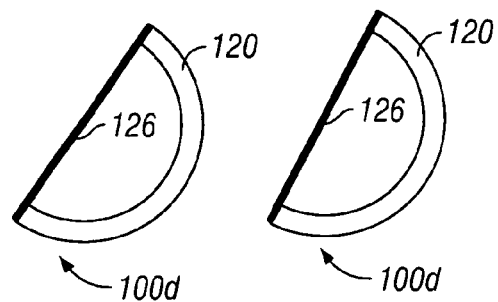
Figure 11A:
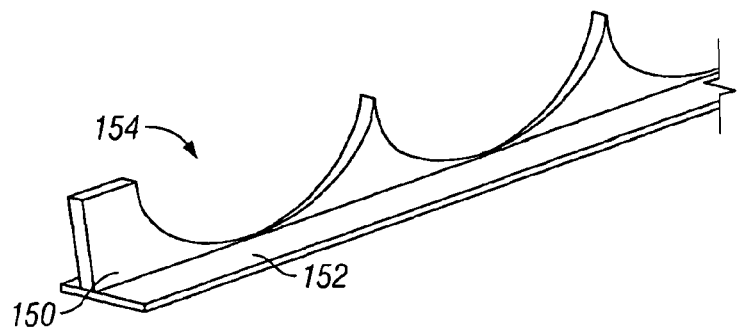
FIG. 11A is a partial enlarged perspective view of a scalloped carrier member for supporting adjacent light-controlling members and FIG. 11B is a similar partial perspective view showing a pair of juxtaposed scalloped carrier members.
Figure 11B:
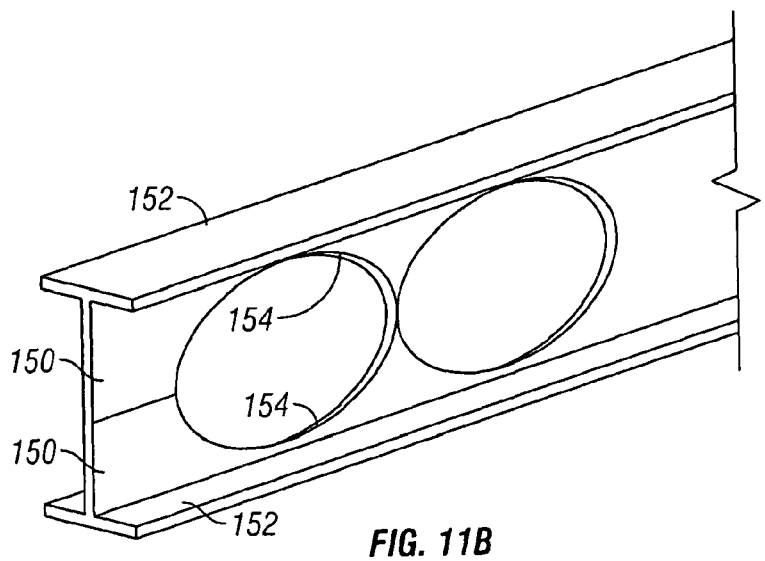

FIGS. 10A-10C are diagrammatic representations of two light-controlling members 100d in three different positions. In FIG. 10A, the two light-controlling members are in the "fully closed" position, with the opaque members 126 of the tubes 120 adjacent each other and fully blocking incoming light 144. This figure should be contrasted with the depiction of the prior art system of U.S. Pat. No. 6,499,255 in which in the fully closed position depicted, light rays 22 penetrate the panel through the walls 17 between the cells 16. In FIG. 10B, tubes 120 have been rotated 90° so that the maximum amount of light 144 may pass by the tubes. Finally, in an intermediate position of the tubes as shown in FIG. 10C, only a portion of the light will pass.

In each of the embodiments of this invention, the opaque members may be replaced with light-blocking members which are not opaque but rather are semi-opaque so that a limited amount of light will pass in the fully closed position, as may be required or desired in certain applications. Also, the opaque or semi-opaque members may include photovoltaic solar cells such as photovoltaic cell 107 in FIG. 9H to generate electricity, preferably in conjunction with means for maximizing the photovoltaic output by rotating the light-controlling members with movement of the sun across the sky to insure that the photovoltaic solar cells continuously receive the maximum possible sunlight exposure. Finally, where the sole objective is to generate electricity, the opaque members may be replaced with transparent or translucent photovoltaic solar cells.

Figure 13:
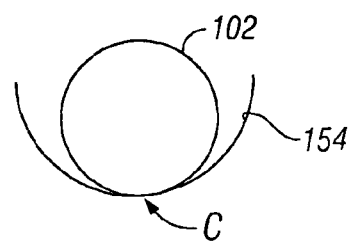
FIG. 13 is an exaggerated diagrammatic representation taken in elevation view of a single light-controlling member resting in a scallop in a carrier member.

We turn now to FIGS. 11A, 11B, 12A and 12B. These figures illustrate scalloped carriage members 150 each comprising a generally horizontal base 152, and a series of hemispherical cut-outs or "scallops" 154 in their top surface. Scallops 154 are intended to receive the light-controlling members and are therefore slightly greater in diameter than the light-controlling members. Thus, as illustrated in FIG. 13, the area of contact between the outer surface C of the tube 102 and the inner surface of a scallop 154 is minimized, thereby minimizing the friction between the two, as the light-controlling member is rotated.

In the fully assembled panel, support of the light-controlling members may be provided by a series of carriage members spaced along the panel for supporting and horizontally positioning the light-controlling members adjacent each other. The scalloped carriage members may be used singly or in pairs, clamped together using a clamping spring 156, as depicted in FIG. 12B. When the carriage members are used with light controlling members with sills, as in 100c of FIG. 9, the sills should be cut away to provide clearance for the carriage members. Furthermore, since the use of sills permits increased spacing between adjacent light-controlling members, the spacing between the scallops can be increased, permitting a concomitant increase in the surface area of the abutting surfaces 151 and 153 (FIG. 12A) of the carriage members and the option of placing connecting members (e.g., hook and loop (Velcro®) connectors, self-tapping screws, snap fasteners, etc.) at those abutting surfaces to help lock the carriage members together.

The carriage members preferably will be made of a low friction material such as a low friction engineered plastic like polycarbonate or a low friction metal like aluminum, and the scallops and/or the portions of the light-controlling members riding in the scallops may be coated with a slippery coating such as teflon. Also, when a hemispherical light-controlling member is used (e.g., 100d), rings may be disposed on the light-controlling member at the point of contact with the scallops to extend the range of rotation. When hemispherical light-controlling members with sills are used, the sills may be cut away to permit annular members to be disposed on the light-controlling member at the point of contact with the scallops.

A fully assembled panel system 160 is shown in FIGS. 14A, 14B, and 14C (respectively, top plan, side elevation and cross-sectional views), with a series of scalloped carrier members 150A, 150B and 150C spaced within a panel unit comprising interior panel 162, exterior panel 164, and a series of light-controlling members 166 within the panel system resting on the scalloped carrier members which support the light-controlling members.

Turning now to FIGS. 15A-15C, three alternative means for transmitting motion across adjacent light-controlling members are illustrated. In the first motion-transmitting arrangement, an annular endcap 170 is attached to one end of a light-controlling member 172 and the endcap is provided with a band 174 of a high coefficient of friction material, such as rubber or polyurethane, so that circular motion imparted to one light-controlling member in the series of adjacent members will impart motion to the remaining members due to the frictional linkage achieved by the high coefficient of friction material positioned in alignment on adjacent members. One or more bands 174 may also be applied along the light-controlling members when they are tubular, either in lieu of the band on endcap 170 or in addition to it. Also, it is preferred that the bands be clear or translucent, particularly when they are disposed along the light-controlling members. Additionally, where the light-controlling members have sills, as discussed above, the sills will be cut away to provide clearance for the rings.

In the second motion-transmitting arrangement, one or more notched bands 176 are positioned along a light-controlling member 178 and aligned so that the intermeshed bands of adjacent light-controlling members transmit motion imparted to one member across the series of intermeshed members. Such intermeshing bands may also be used on an endcap as described above and further use of clear or translucent intermeshing bands is preferred. Also, as in the prior embodiment, where the light-controlling members have sills as discussed above, the sills will be cut away to provide clearance for the rings.

In the third motion-transmitting arrangement, the outer surface 182 of each of light-transmitting members 180 is provided (as by extruding) with a cogwheel cross-section, as shown, including a series of teeth 184 extending along their length so that the adjacent light-transmitting members intermesh to transmit motion imparted to one member (as by a drive motor (not shown)) across the series of intermeshed members. An opaque member 188 is preferably positioned within the cogwheel cross-section between a diametrically opposing pair of teeth 184a and 184b so that the opaque member extends into the teeth and is supported along its lateral edges within the opposing teeth. This embodiment has some significant advantages. First, the intermeshing teeth provide a wide tolerance as to fit between adjacent light-controlling members and tolerance to dirt or other extraneous matter which may find its way into the area. Second, since the opaque member extends into the teeth and is supported along its lateral edges within the opposing teeth in the closed position, the opaque members of adjacent light-controlling members will overlap, blocking the passage of light between adjacent light-controlling members.

End views of the light-transmitting members resting within a series of three panel systems, 186, 187 and 190 as described above are illustrated in FIGS. 16A-16C. In panel system 188, however, a small gear 192 is located between the adjacent spaced light-controlling members to enable the light-controlling members to rotate in the same direction as the adjacent notched bands intermesh with the wheels.

The above and other methods may be used for rotating adjacent light-controlling members where rotary motion is imparted to one or more (but not all) of the adjacent light-controlling members either manually or by motorized means, as represented diagrammatically by feature M in FIG. 12A. Any of the mechanisms described in U.S. Pat. No. 6,499,255, for example, may be used for imparting such rotary motion.

Figure 17A:
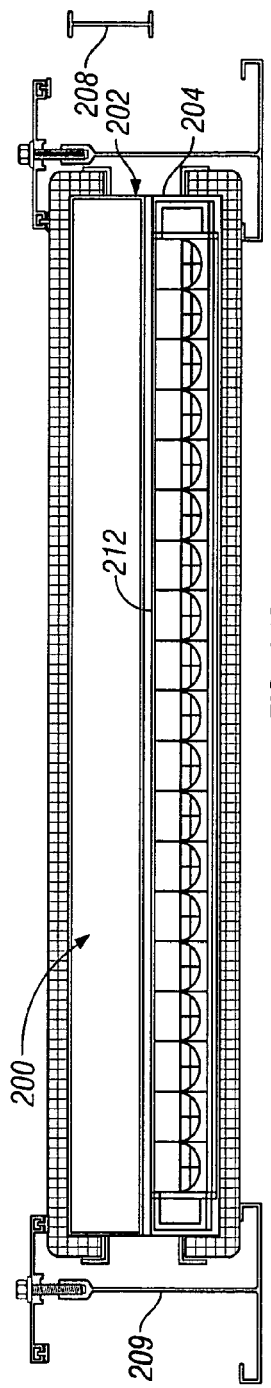
FIGS. 17A and 17B comprise alternative embodiments of the invention in which a metal screen and insulating materials are located within the panel system.
Figure 17B:
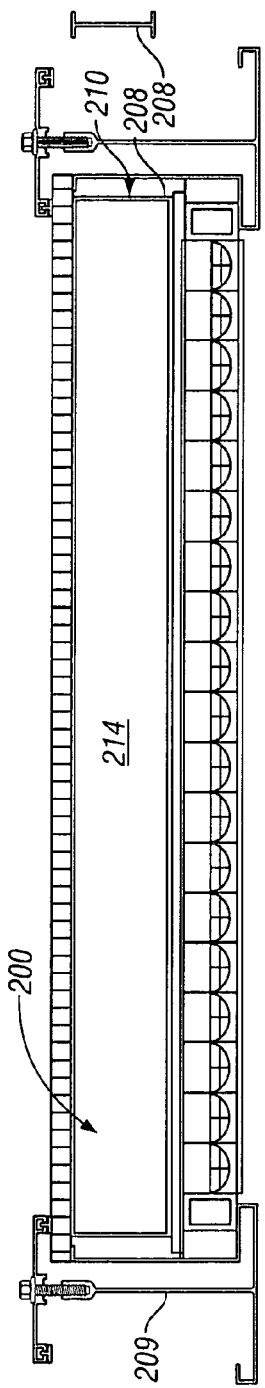

Turning now to FIGS. 17A and 17B, a further embodiment of the present invention is disclosed in which space 200 is provided above the plane of the adjacent light-controlling members in the panel unit. Thus, for example, in FIG. 17A, a panel joining system 202 much like that of panel joining system 36 in FIG. 2 is shown, except that this panel-joining system 202 has an elongated upstanding bracket 204 and is used in conjunction with elongated spacer rails 208, shown in side view at the right of the figure. A different enlarged panel-joining system 210 is used in the embodiment of FIG. 17B with different panels, and the panels are held together by a different attachment mechanism. In both cases, enlarged clamps 209 are used to joint adjacent panel units.

In both the embodiments of FIGS. 17A and 17B, a series of "I" beams 208 are positioned at intervals between the lateral edges of the interior and exterior panels to create an air space 210 between the panels. In FIG. 17A, a panel of a non-combustible generally light-transmitting material, such as a metal screen 212, is positioned above the light-controlling members and held tautly in position. In FIG. 17B, a series of "I" beams 208 are positioned at intervals between the lateral edges of the interior and exterior panels to create an air space 210 between the panels. In FIG. 17A, a layer of light transmitting fire-resistant insulating material, such as loose glass fibers 214, is disposed immediately above the screen in air space 210 to add thermal insulation and to enhance the fire resistance of the panel system. The screen and insulating material prevent or delay the passage of burning particles through the panel system, in accordance with the requirements of ASTM E-108 Class A Fire Rating Requirements. The resulting panel system thus provides the light transmission and control characteristics of the other embodiments of the invention as well as improved fire resistance.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A transparent/translucent panel unit for varying the level of light passing therethrough comprising:

a pair of spaced-apart transparent/translucent panels;

a plurality of adjacent substantially light-blocking elongated light-controlling members each having a longitudinal axis and a series of annular rings spaced along the light-blocking members at a plurality of locations along the light-controlling members and between their ends; and a plurality of opposed pairs of scalloped carriage members having circular scalloped engagement surfaces positioned between the panels and spaced along the longitudinal axes of the light-controlling members with the plurality of opposed pairs of scalloped carriage members engaging and supporting the light-controlling members at the annular rings, and with the rings of the individual light-controlling members received for rotation between opposed scallops of the plurality of opposed pairs of scalloped carriage members.

2. The transparent/translucent panel unit of claim 1 in which the panels are made from a material chosen from the group consisting of plastics, fiberglass, perforated metal fabric, and glass.

3. The transparent/translucent panel unit of claim 1 in which the panels are chosen from the group consisting of honeycomb cross-sectioned polycarbonate translucent panels and rectangular cross-section polycarbonate translucent panels.

4. The transparent/translucent panel unit of claim 1 in which the light-blocking members are substantially opaque or substantially semi-opaque.

5. The transparent/translucent panel unit of claim 1 in which the light-blocking members are hemispherical.

6. The transparent/translucent panel unit of claim 1 including a panel of a non-combustible generally light-transmitting material positioned within the panel unit above the light-controlling members.

7. The transparent/translucent panel unit of claim 1 including an air space between the panels and a light-transmitting fire resistant insulating material disposed within the air space.

8. The transparent/translucent panel unit of claim 1 in which the light-blocking members include photovoltaic solar cells.

9. A transparent/translucent panel unit for varying the level of light passing therethrough comprising:
   a pair of spaced-apart transparent/translucent panels;
   a plurality of adjacent flat substantially light-blocking elongated light-controlling members each having a longitudinal axis and a series of annular rings spaced along the light-blocking members at a plurality of locations along the light-controlling members and between their ends; and
   a plurality of opposed pairs of scalloped carriage members having circular scalloped engagement surfaces positioned between the panels and spaced along the longitudinal axes of the light-controlling members with the plurality of opposed pairs of scalloped carriage members engaging and supporting the light-controlling members at the annular rings, and with the rings of the individual light-controlling members received for rotation between opposed scallops of the plurality of opposed pairs of scalloped carriage members.

10. The translucent/transparent panel unit of claim 9 in which the panels are made from a material chosen from the group consisting of plastics, fiberglass, perforated metal fabric, and glass.

11. The transparent/translucent panel unit of claim 9 in which the panels are chosen from the group consisting of honeycomb cross-sectioned polycarbonate translucent panels and rectangular cross-section polycarbonate translucent panels.

12. The transparent/translucent panel unit of claim 9 in which the light-blocking members are substantially opaque or substantially semi-opaque.

13. The transparent/translucent panel unit of claim 9 including a panel of a non-combustible generally light-transmitting material positioned within the panel unit above the light-controlling members.

14. The transparent/translucent panel unit of claim 9 including an air space between the panels and a light-transmitting fire resistant insulating material disposed within the air space.

\* \* \* \* \*